March 13, 1956  R. ZAPHIROPOULOS  2,738,436
ELECTRODE STRUCTURE

Filed Sept. 2, 1952  2 Sheets-Sheet 1

INVENTOR.
RENN ZAPHIROPOULOS
BY
Lippincott & Smith
ATTORNEYS.

March 13, 1956 R. ZAPHIROPOULOS 2,738,436
ELECTRODE STRUCTURE
Filed Sept. 2, 1952 2 Sheets-Sheet 2

INVENTOR.
RENN ZAPHIROPOULOS
BY
Lippincott & Smith
ATTORNEYS.

United States Patent Office 2,738,436
Patented Mar. 13, 1956

2,738,436

ELECTRODE STRUCTURE

Renn Zaphiropoulos, Oakland, Calif., assignor to Chromatic Television Laboratories, Inc., New York, N. Y., a corporation of California Application September 2, 1952, Serial No. 307,436

11 Claims. (Cl. 313—78)

The present invention relates to improved electrode structures suitable for use in cathode ray tubes. Particularly, the invention is concerned with multiple strand grid structure, supporting, in proximate relation thereto, a target or screen area adapted to be impacted by scanning beam electrons. The grid functions to deflect the scanning beam electrons and to focus the beam to an extremely fine trace on the target when suitable potentials relative to the beam source are applied to the grid strands. The electrode structure of the present invention is suitable for application with, for example, the circuit arrangements as described in United States patent application of Ernest O. Lawrence, Serial No. 234,190, filed June 29, 1951, now U. S. Patent No. 2,711,493 granted June 21, 1955, and entitled "Direct-View Color Tube."

In the afore-mentioned application the target or screen is either phosphor coated or provided with color filters which, in one dimension at least, are smaller than a picture element. The phosphors employed are capable of producing light representative of at least two primary colors of an additive polychrome system and if desired a tricolor system employing, for example, red, blue and green light-producing phosphors may be used for coating the target area. In the alternative, color filters may be similarly employed. In either event it is only necessary that the areas covered be smaller in at least one dimension than a picture element and that the individual phosphors or filters be deployed in cyclically repeating colors. Accordingly, the multiple strand grid is interposed between the source of the electron scanning beam or beams as the case may be, and the target. Thus the developed scanning beam must pass through the grid in order to impact the target and produce thereon the desired luminous effects.

The grid of the instant invention is comprised of electrical conducting means which, when viewed from the beam source, appear as individual strands very nearly uniformly spaced apart. These strands may be alined relative to the phosphor coatings on the target such that the spacing between adjacent strands is substantially equal to the width of a picture element. Also the spacing between adjacent strands is substantially equal to the width of a color cycle comprised of the minimum number of phosphor strips or segments necessary to produce the primary colors of the polychrome system employed. In order to simplify the description of the present invention reference hereinafter to specific colored phosphors is to be understood as meaning that particular phosphor capable of producing the specific color of light mentioned when impacted by the scanning beam electrons.

The conducting strands of the grid are preferably disposed in a substantially coplanar relation and are spaced from the target by means of spacer elements. The grid functions to focus the electron scanning beam into a linear trace of a width less than the width of a phosphor strip or area on the target; the distance between the target and grid being preferably about ten times the spacing between adjacent strands (although this is not critical) and the potential relative to the electron source which is adapted to be applied to the target should be approximately three times that applied to the grid. By additionally applying relative potentials, of the order of magnitude of one-sixth of that normally on the grid, to alternate strands of the grid, the angle of incidence of the trace is altered and consequently the trace is effectively deflected in the direction of the strands which are most positive relative to the electron source. Thus the beam may be caused to impact the phosphor coated target at any desired position and, consequently, complete color reproduction is obtainable.

The construction of a grid comprised of a plurality of uniformly spaced conducting strands which is suitable for the uses herein proposed has heretofore been laborious, time consuming, and costly. Furthermore, such constructions are subject to deformation due in part to inherent stresses in the structures and also to such forces established in the "baking out" and degasing processes essential to the manufacture of tubes in which such grids are employed.

Accordingly, among the objects of the present invention are the following: to provide a deflecting and focusing electrode structure suitable for use in cathode ray tubes, to provide such electrode structure adapted, with the application of potential thereto, to alter the angle of incidence of the scanning beam electrons which impact the target, to provide electrode structure of this character which offers a minimum of interception to the infalling cathode rays, to provide such an electrode structure which is free from inherent deforming stresses and which is constructed to preserve the alinement of the grid strands during both the processing stage and useful life of the tube and to provide electrode structure admitting of accurate construction at low cost.

Briefly, this is accomplished by combining the multiple strand grid structure with the target or target backing. A light transmissive base plate capable of being secured adjacent the viewing end of the tube by the grid structure forms the target area or target backing. The different colored phosphors of the system to be employed are deposited in strips or segments along one face of the base plate and spacer elements are effixed to this face adjacent the phosphor coated area. A pair of channels respectively positioned on opposed peripheral portions of the base plate provide a supporting framework for electrically conducting means which comprise the multiple strands of the grid structure. Insulating means secure the electrically conducting means to each channel. Further insulators provide electrical isolation between the channels and the electrically conducting means with the latter extending over the further insulators to present the appearance of substantially parallelly alined strands which are spaced from the phosphor coated face of the base plate by the spacer elements.

The foregoing will be more apparent from a reading of the following detailed description of the invention when taken in conjunction with the accompanying drawings wherein.

Figure 1:
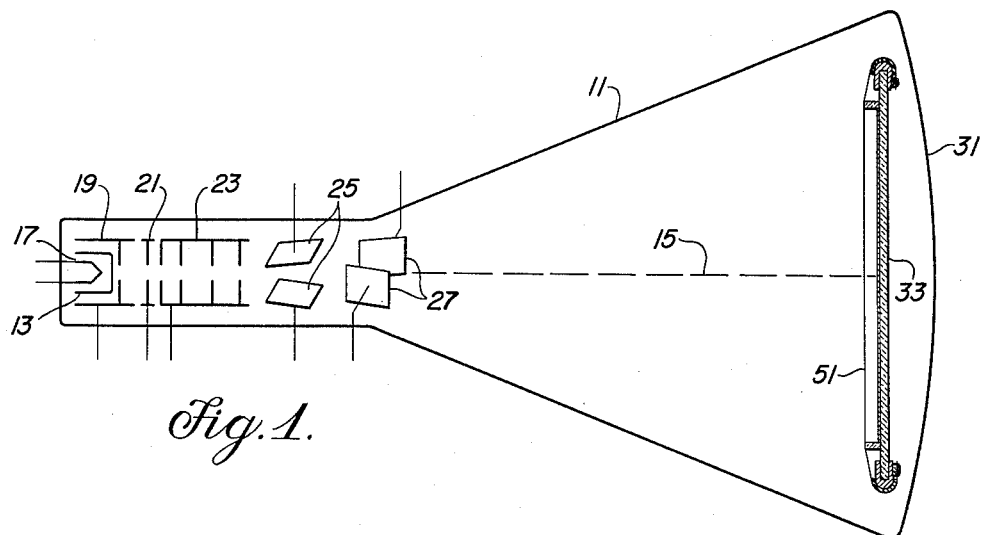
Fig. 1 is a diagrammatic representation of a single-gun tube embodying an electrode structure in accordance with the present invention.

Referring now to the drawings and particularly to the showing of Fig. 1, a cathode ray tube comprising a conventional type of evacuated envelope 11 is shown in semi-diagrammatic form. The tube is represented as being of the single gun type provided with a thermoemissive cathode 13 adapted to emit electrons in the form of a scanning beam as indicated by the trace 15 when heated by a filament 17. The neck of the tube may house the usual electrode structure comprising a grid or control electrode 19 which partially surrounds the cathode 13 and which functions to modulate the stream of electrons passing through an aperture provided in the control electrode. A first anode 21 accelerates the electrons of the beam in an axial direction toward a second anode 23 which functions to focus the beam and provide the final acceleration for the beam electrons insofar as the electrode structure located in the neck of the tube is concerned.

In the tube represented in Fig. 1 conventional means for deflecting the beam electrostatically are provided in the form of a pair of horizontal deflecting plates 25 and a pair of vertical deflecting plates 27. The horizontal and vertical labels are applied merely for the sake of convenience of description and are not to be construed as a limitation on the arrangement of the deflecting plates. Thus, Fig. 1 may be considered as a view in plan for purposes of explanation of the present invention. The opposite end of the tube is provided with a viewing area or window 31 through which light is adapted to pass the viewer. The electrode structure of the present invention is adapted to be mounted within the tube adjacent the viewing area. This structure comprises a target backing or translucent base plate 33 which carries the phosphor coating and is preferably formed of a boro-silicate glass having a low coefficient of expansion and is secured within this end of the tube by structure later to be described.

Figure 3:
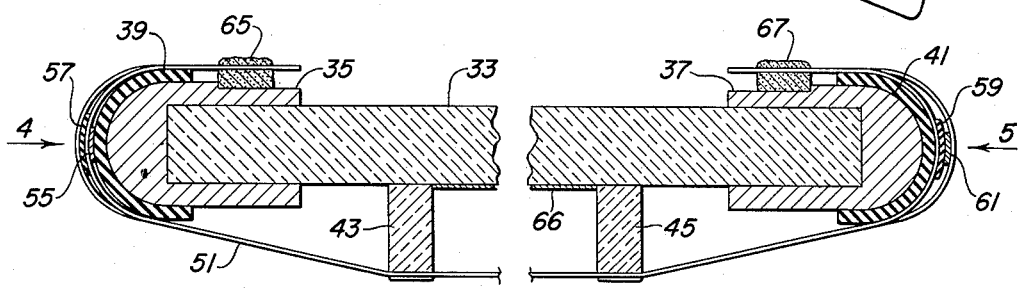
Fig. 3 is an enlarged sectional view of the electrode structure embodied in the tube of Fig. 1.

Looking at Fig. 3 which is a cross sectional view of the translucent base plate 33 and associated electrode structure, a pair of metal channels respectively designated as 35 and 37 is shown with the channels being positioned on opposed edges of the plate 33. The channels are dimensioned to fit rather snugly onto the base plate and to provide preferably, although not necessarily, external arcuate peripheries about a portion of each of which insulating sleeves 39 and 41 are respectively mounted. The sleeves may comprise, for example, rectangular pieces of glass ribbon or mica secured to the channels by means of vitreous cement. However, as will later be apparent, it is not necessary that the sleeves be affixed to the channels.

Adjacent the channels 35 and 37 and on the side of the base plate 33 facing the electron beam source, a pair of spacer elements respectively designated by the reference characters 43 and 45 is secured. These spacer elements are affixed to the translucent base plate by vitreous cement having the property of minimum gas absorption so as not to impair the tube characteristics during and subsequent to the bake-out preparation period. One example of a suitable cement is that manufactured under the trade name Kasil, which is a potassium silicate derivative. If desired glass frit may be mixed with the Kasil to provide an even better bond. Thus a target or target area is defined on the face of the base plate within the limiting boundaries of the spacer elements.

Figure 4:
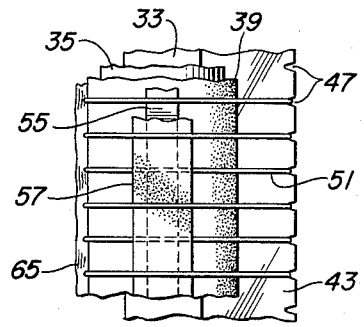
Fig. 4 is an end view of the structure of Fig. 3 looking in the direction of the arrow designated by the numeral 4.
Figure 5:
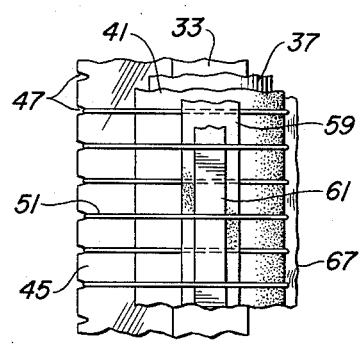
Fig. 5 is a view of the other end of the structure of Fig. 3 looking in the direction of the arrow designated by the numeral 5.
Figure 9:
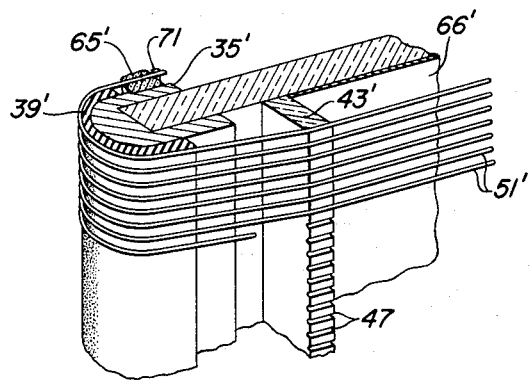

Each of the spacer elements 43 and 45 is provided with a plurality of slots 47 substantially evenly disposed along the longitudinal dimensions thereof, as is best shown in Figs. 4, 5 and 9. Likewise, as is illustrated in Figs. 4 and 5, the slots disposed in spacer element 43 are transversely alined with the slots disposed in spacer element 45. The spacers 43 and 45 may be comprised of boro-silicate glass or other material having a low coefficient of expansion. If the spacers are formed of glass either abrasive or photo-etching processes may be employed to cut accurately the slots 47 therein. For example, diamond impregnated high-speed laps have been found satisfactory for the purpose of forming the slots 47. While these slots have been referred to as substantially uniformly spaced, it is to be understood that the spacing may be graduated to compensate for deviations in the angle of incidence of the beam between the axis and the edges of the target. Electrically conducting means in the form of individual strands 51 are wound about the base plate 33, insulating sleeves on the channels 35 and 37, and spacer elements 43 and 45 in continuous loop fashion to present the grid like appearance of Fig. 2 when viewed from the electron source. The winding process is preferably carried out with the aid of a jig which evenly deploys the strands in the slots 47 under a tension of, for example, fifty thousand (50,000) pounds per square inch on the strands. The fifty thousand (50,000) pounds per square inch is merely illustrative as obviously the tension will depend upon the various geometries of the electrode structure and size of the tubes in which the structures are to be employed, as well as, the type and size wire used as a conducting means. In order that the wire will intercept only a minimum number of the electrons being directed toward the target it is desirable to employ wire having relatively small cross sectional dimension. For example, 6 mil wire which is commercially available in stainless steel or nickel has been found suitable for applications in the present invention, although finer wire may be used if desired. With 6 mil wire the individual strands are only under a tension of about two pounds.

Figure 6:
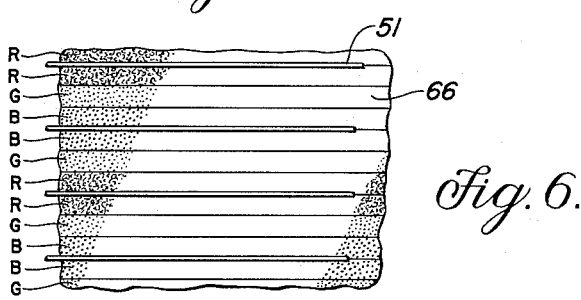
Fig. 6 is a detailed view of a portion of the target or screen area showing a preferred arrangement of phosphor coatings thereon.

The actual spacing of the strands is determined by the disposition of the phosphor coating on the base plate 33. In Fig. 6 there is represented a preferred arrangement of the phosphor strips deposited on the target backing plate 33 between the spacer elements 43 and 45 with the conducting strands 51 being spaced from the plane of the phosphor strips and located intermediate segments of red and blue light producing phosphors by the spacer elements.

The transverse dimensions of the red, green and blue phosphor strips are smaller than one picture element, and the spacing between adjacent strands is equal to a picture element and includes equal widths of the three phosphors constituting a color cycle. Color change is accomplished by applying different potentials to adjacent strands, to direct the beam, after passing through the grid, to the phosphor of the selected color.

Figs. 3, 4 and 5 show a preferred arrangement of structure suitable for connecting like or opposite potentials relative to the beam source to adjacent strands in the grid electrode. Prior to the winding process a conducting strip or terminal 55 is placed adjacent to the insulating sleeve 39. If desired, suitable inorganic ceramic cement may be employed to affix the terminal 55 to the insulating sleeve 39, or, in the alternative, the strands 51 may suffice to hold the terminal 55 in position. During the initial winding operation alternate strands only are placed over the channels and through the slots 47 in the spacer elements 43 and 45. Then a pair of spacer insulators, respectively designated as 57 and 59, which may comprise the materials employed for the sleeves 39 and 41, is placed respectively adjacent the alternate turns or strands 51 which extend over the sleeves 39 and 41. A conducting strip or terminal 61 is then placed adjacent the insulator 59 and the winding process is continued with the vacant slots 47 in the spacer elements 43 and 45 being filled to afford a grid having the appearance of that shown in Fig. 2. It should now be apparent that the conducting strip or terminal 55 contacts alternate strands 51 and is insulated from the remaining strands 51 by insulator 57 to form one set of conductors, whereas conducting strip or terminal 61 is in contact with the alternate strands 51 respectively disposed between the strands contacted by the terminal 55 to mutually connect a separate set of conductors.

After the winding operation has been completed a layer of ceramic cement is brushed or dabbed onto the strands 51 along the longitudinal dimensions of the sides of the channels 45 and 47 disposed in the direction of the viewing end 31 of the tube. The function of this cement is that of securing the strands to the channels in electrical isolation therefrom. Suitable insulating cement for this purpose is manufactured under the trade name Insa-lute. Of course, any other cement having the properties of Insa-lute, i. e. inorganic material having a minimum absorption, with resultant ready outgassing during bake-out or processing of the tube will suffice for this purpose. The structure is next baked at a moderate temperature to set the Insa-lute and form ridges 65 and 67 shown in Fig. 3. It is desirable to select channel material and Insa-lute mixtures having coefficient of expansion of the same order thereby guarding against fracture of the cement during tube bake-out. Subsequently, the portions of the strands 51 extending between the ridges 65 and 67 are cut and discarded to provide the completed electrode structure shown in Fig. 3.

If desired an aluminum film may be applied, for example, by a sputtering process to overlie the phosphor coating 66 (Fig. 3) disposed on the base plate 33 between the spacers 43 and 45. As is well known such a film provides a substantially equi-potential surface and also preserves image producing light by reflecting the various colored light outwardly of the tube through the viewing area 31. A terminal 64 (Fig. 2) is provided for applying potential to this surface.

As has hereinbefore been mentioned the potential applied between the electron source and the multiple strand or lens-grid is approximately one-third (⅓) of that applied between the source and the luminescent screen, i. e. the aluminum film or phosphor coating 66. As a result of the spacing of the strand conductors comprising the grid electrode of the present invention and the potentials applied to the tube electrodes, the electrons entering between adjacent strands 51 are brought to a line focus in substantially the plane of the phosphor coatings along a line which lies midway between adjacent strands when the potentials applied to the adjacent wires or strands are equal and like. The angle of incidence of the beam is altered in accordance with the color to be displayed by the application of opposite potentials to adjacent strands. The time of transition between a phosphor area of one color and that of another may be made sufficiently small as to cause negligible contamination or color dilution. This is due to the small width of focus of the substantially linear trace relative to the width of a picture element or the dimensions of the original scanning beam. When desired blanking may be employed during the transition period between colors and the time of blanking may be so short that the duty cycle of a tube employing the instant invention may be limited to within the neighborhood of ninety percent (90%).

Figure 2:
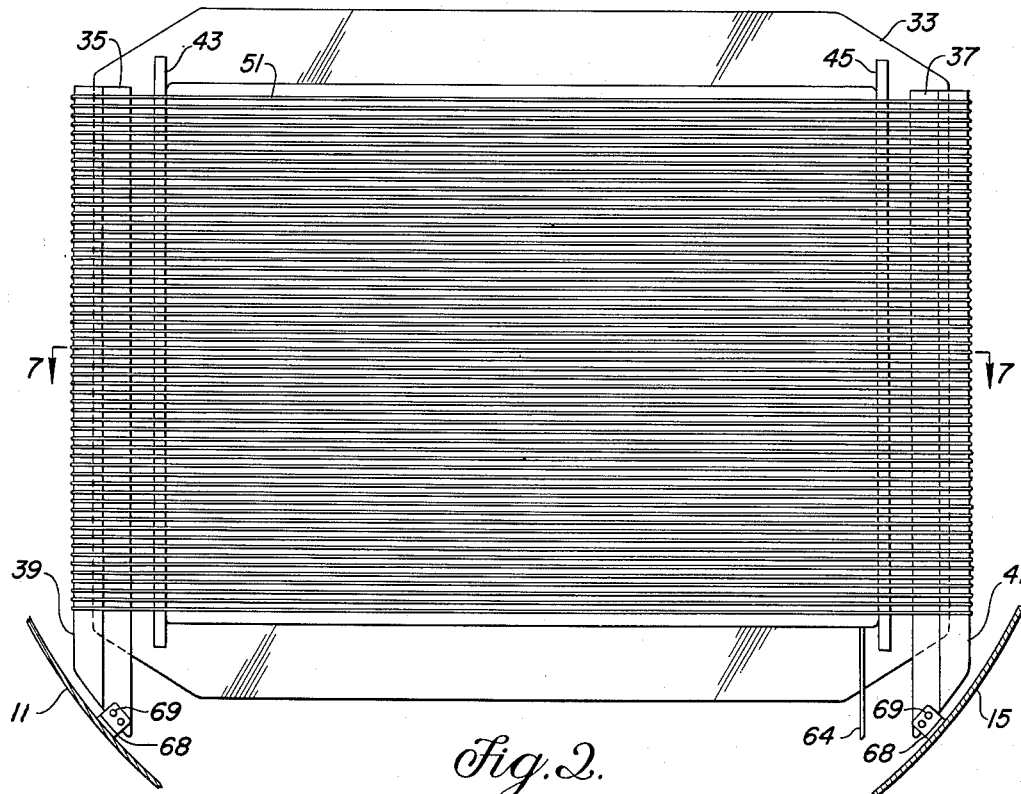
Fig. 2 is an elevational showing of the light transmissive base plate and strand conductors positioned relative thereto, as viewed from the electron beam source.

For obvious reasons metal shells have recently been replacing glass envelopes particularly in tubes of the 20" and over variety. Accordingly Fig. 2 shows suitable means for mounting the electrode structure of the instant invention within metal shelled tubes, it being realized, of course, that the invention may be applied to tubes of the glass envelope type as well. At appropriate positions along the internal periphery of the envelope 11 angles 68 extend inwardly of the envelope to provide for the attachment of the channels 35 and 37 or extensions of the same. The angles are preferably welded to the envelope and the channels are secured thereto by means of rivets or bolts 69 which extend through insulating bushings and mica spacers (not shown). Thus, electrical isolation is maintained between the multiple strand grid and the tube envelope. Such an arrangement is also described in United States patent application entitled "Electrode Structure," Serial No. 307,435, filed concurrently with this application by the same inventor and now U. S. Patent #2,683,833 granted July 13, 1954.

The basic structure hereinbefore described permits a glass target to be positioned within a tube free from fastening apertures. Therefore, the base plate is free from local stresses. The tension imposed on the strands 51 places the plate under slight compression and assures a fixed relation between the channels and plate. Among suitable materials for the channels is 430 modified steel which of course has a coefficient of expansion greater than that of the target backing material. Thus, during the tube preparation period when the ambient temperature is near 400° C. expansion of the target backing or translucent base plate is permitted. The strands should be sufficiently tensioned in the winding process as to bring the mechanical vibrational period beyond frequencies capable of being transmitted by the electrode mountings. This condition then obtains subsequent to the cooling period.

Figure 7:
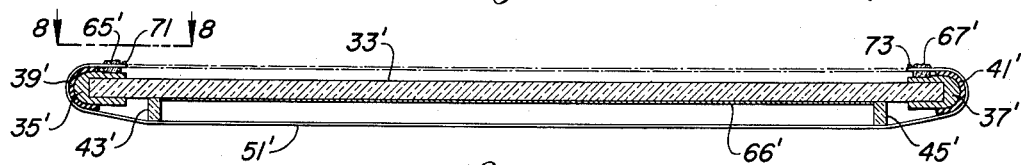
Fig. 7 is a view in cross section of the structure of Fig. 2 taken along the plane 7—7 and showing a modified form of the invention.
Figure 8:
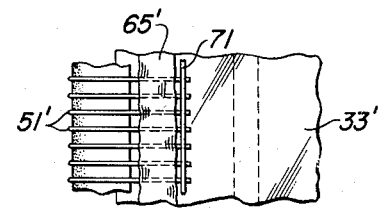
Fig. 8 is a segmental plan view of a portion of the structure of Fig. 7 as seen along the plane 8—8 when looking in the direction of the arrows thereof; and, Fig. 9 is an enlarged perspective view of a portion of the electrode structure of Fig. 7.

Figs. 7, 8 and 9 show a somewhat simpler embodiment of the present invention in the arrangement of the conducting strands or terminals connecting alternate strands of the grid. In Fig. 7, which is a view similar to Fig. 3, but drawn to a smaller scale, a pair of channels 35' and 37' are disposed respectively on opposite edges of the target backing or base plate 33'. Insulating sleeves 39' and 41' are juxtaposed respectively over the channel members 35' and 37' to insulate electrically the conducting strands 51' from the channels. In the manner of the structure shown in Fig. 3 these strands are fixed in Insa-lute mounds 65' and 67' and extend along the face of the backing plate 33 disposed in the direction of the electron beam source, being spaced therefrom by spacer elements 43' and 45'. An aluminum conducting strip or surface overlies the phosphor coated area 66' to provide a uniform potential surface relative to which the potential of the strands may be varied. Adjacent the extremities of the strands 51' and in juxtaposition with the Insa-lute mounds 65' and 67' there is provided respectively conducting terminals 71 and 73 which electrically link together respectively alternate strands of the grid system. In order to insure, for example, that conductor 71 only contacts alternate strands 51 the extremities of the strands which are not to be contacted may be depressed sufficiently as to place them out of the plane of the extremities to which the conductor 71 is soldered or welded. Thus, conductors 71 and 73 are adapted in like manner to supply different sets of strands with potential.

In either embodiment of the present invention optimal operation is achieved when potentials of conventional magnitude are applied to the electrode structures situated in the neck of the tube with 3 to 4 kilovolts being applied to the multiple grid strands and with 12 to 16 kilovolts serving the aluminum film or target area (both relative to the beam source). By additionally applying 500 to 700 volts to one or the other sets of strand conductors deflection of the scanning beam trace from the intermediate green phosphor strip onto the red or blue phosphor strips is obtained. It is to be understood that this, as well as other examples herein set forth are to be construed merely by way of illustration and not by way of limitation.

What is claimed is:

1. Electrode structure comprising a light transmissive base plate having a front and back surface, a pair of channels respectively straddling opposed edges of the base plate, a pair of spacer elements affixed to the front surface of the base plate, a plurality of electrical conductors each being secured near an end thereof to one of said channels in spaced relation therealong and in positions adjacent to the back surface of said base plate, said conductors extending over said one channel and spaced from said front surface by the spacer elements and extending over the other of said channels, each of said conductors being secured near an end thereof to the other of said channels in spaced relation therealong and in positions adjacent to said back surface, and insulating means interposed between the conductors and the channels.

2. Electrode structure comprising a light transmissive base plate, a pair of channels respectively positioned on opposed edges of the base plate, a pair of spacer elements affixed to a surface of the base plate, electrically conducting strands anchored to the channels adjacent to a surface of the base plate opposed to said first mentioned surface and extending transversely around the peripheries of the channels and along one dimension of and adjacent to said first mentioned surface and spaced therefrom by said spacer elements, insulating means interposed between said channels and electrically conducting strands, and terminal points adapted for the application of potential to the electrically conducting strands.

3. Electrode structure comprising a light transmissive base plate having a front and back surface, a pair of channels respectively straddling opposed edges of the base plate, a pair of spacer elements affixed to the front surface of the base plate, a plurality of electrical conductors each being secured near an end thereof to one of said channels in spaced relation therealong and in positions adjacent to the back surface of said base plate, said conductors extending over said one channel and spaced from said front surface by the spacer elements and extending over the other of said channels, each of said conductors being secured near an end thereof to the other of said channels in spaced relation therealong and in positions adjacent to said back surface, insulating means interposed between the conductors and the channels, and terminal means in electrical connection with the conductors.

4. Electrode structure comprising a light transmissive base plate having a front and back surface, a pair of channels respectively straddling opposed edges of the base plate, a pair of spacer elements affixed to the front surface of the base plate, a plurality of electrical conductors, first insulating means securing each of the conductors near an end thereof to one of said channels in spaced relation therealong and in positions adjacent to the back surface of said base plate, said conductors extending over said one channel and spaced from said front surface by the spaced elements and extending over the other of said channels, second insulating means securing each of said conductors near an end thereof to the other of said channels in spaced relation therealong and in positions adjacent to said back surface, and third insulating means interposed between the conductors and the channels.

5. Electrode structure comprising a light transmissive base plate, a pair of channels respectively located on opposed edges of the base plate, a pair of spacer elements each having a plurality of transverse slots therein affixed to a surface of the base plate to define a window area therebetween, an insulating layer at least partially overlying each of the channels, a first terminal element in juxtaposition with one of the insulating layers, a first set of electrically conducting strands, insulating means for securing the electrically conducting strands to each of the channels adjacent to a surface of the base plate opposed to said first mentioned surface, said conducting strands extending from the insulating means over the insulating layers and in contact with the first terminal element through alternate slots in the spacer elements and across said window area and spaced therefrom by the spacer elements, a pair of spacer insulators respectively located externally of and adjacent to portions of the electrically conducting strands traversing said insluating layers, a second terminal element positioned adjacent to one of said spacer insulators, and a second set of electrically conducting strands extending from the insulating means respectively over the spacer insulators and in contact with the second terminal element, through slots respectively adjacent to said alternate slots and across said window area whereby the appearance of a plurality of individual strand conductors spanning the window area is presented.

6. A target assembly for a color television tube comprising a phosphor coated insulating base whereupon an image is adapted to be created within a viewing window area, a multiplicity of tautly strung wires spanning the window area of the base and extending to overlap the base edges, a pair of insulating spacers across which the wires are strung and by which the wires are spaced from the base and held in substantially fixed relationship thereto, means supported upon the opposite side of the base from that having the phosphor coating for so anchoring the wires that they span the window area between the spacers and extend over the base edge to its reverse side, terminal strip means for electrically contacting the strung wires and connecting the wires electrically as two sets of interleaved conductors with alternate wires connected to a different terminal strip.

7. A target assembly for a cathode-ray color television tube having a strip-type phosphor coating upon an insulating base thereof and upon which coating an image is adapted to be created within a viewing window area by cathode-ray beam impact comprising a multiplicty of tautly strung wires spanning the window area of the base in directions parallel to the phosphor strips and extending to overlap the base edges, a pair of spacers across which the wires are strung and by which the wires are spaced from the base in substantially fixed relationship thereto, means for anchoring the wires in a fixed position from the side of the base opposite that having the phosphor coating such that they span the window area between the spacers and extend over the base edge to its reverse side, a pair of terminal strips each electrically contacting alternate strung wires so that the wires are electrically connected as two sets of interleaved conductors with alternate wires connected to a different terminal strip, and insulating means to maintain the wire sets electrically separate.

8. In a cathode-ray tube, an electrode assembly for use in cooperative relationship with an electrically non-conducting base adapted to be coated with phosphor material to become luminescent under cathode-ray beam impact which comprises a pair of insulating spacers secured to one face of the base and separated from each other by a distance greater than one dimension of a window area within which the phosphor material is to be viewed, a plurality of approximately uniformly spaced linear conductors spanning the distance between the spacers and separated from the base by the spacers and extending beyond the spacers to overlap the boundary of the base at its edge nearest each spacer, means for anchoring the linear conductors at points spaced from the opposite surface of the base from that upon which the spacers are held and thereby securing the said linear conductors into two sets in which alternate conductors are in the same set, insulator means to maintain the sets of conductors electrically separate, and a separate terminal conductor in electrical contact with the linear conductors of each set supported in fixed location relative to the base and the anchoring means.

9. Electrode structure comprising a translucent base plate, supporting means along at least a pair of opposed edges of the base plate, a layer of insulation disposed over each of the supporting means, at least one strip conductor disposed over a layer of the insulation, a pair of spacer elements affixed to a surface of the base plate in spaced apart relation to define a window area therebetween, a first set of electrically conducting strands extending over the insulation and strip conductor and across the window area in spaced apart relation and spaced from said surface of the base plate by the spacer elements, means for attaching the strands to the supporting means electrically isolated therefrom, a second layer of insulation disposed over portions of the strands passing over each of the supporting means, a second strip conductor disposed over a second layer of the insulation, and a second set of electrically conducting strands extending over the second insulation and second strip conductor and across the window area respectively between the strands of the first set and secured to the supporting means by the attaching means whereby said first mentioned strip conductor and said second strip conductor comprise electrical terminals for the first set of electrically conducting strands and the second set of electrically conducting strands respectively.

10. Electrode structure comprising a base, a pair of channels respectively extending along a pair of opposed edges of the base, a pair of insulating sheets overlaying respectively the channels, a strip terminal conductor disposed over one of the insulating sheets, a first set of electrically conducting strands extending between the channels and in contact with the strip terminal, insulating means anchoring the strands to the channels in spaced apart positions, a second pair of insulating sheets overlaying portions of the strands extending over each of the channels, a second strip terminal conductor disposed over one of the second insulating sheets, and a second set of electrically conducting strands secured to the supporting means by the insulating means and extending therebetween respectively between the strands of the first set and in contact with said second strip terminal.

11. Electrode structure comprising a translucent base plate, channel means extending along at least a pair of opposed edges of the base plate, a layer of insulation covering at least an outer peripheral portion of each of the channel means, at least one strip conductor disposed over a layer of the insulation, a pair of spacer elements affixed to a surface of the base plate in spaced apart relation to define a window area therebetween, a first set of electrically conducting strands extending over the channel means and electrically separated therefrom by the insulation and strip conductor and across the window area in spaced apart relation and spaced from said surface of the base plate by the spacer elements, insulating means for attaching the strands to the channel means, a second layer of insulation disposed over portions of the strands passing over each of the channel means, a second strip conductor disposed over a second layer of the insulation, and a second set of electrically conducting strands extending over the second insulation and second strip conductor and across the window area respectively between the strands of the first set and secured to the channel means by said insulating means whereby said first mentioned strip conductor and said second strip conductor comprise electrical terminals for the first set of electrically conducting strands and the second set of electrically conducting strands respectively.

References Cited in the file of this patent

UNITED STATES PATENTS

| | | |
|---|---|---|
| 2,064,169 | Kershaw | Dec. 15, 1936 |
| 2,416,056 | Kallmann | Feb. 18, 1947 |
| 2,446,791 | Schroeder | Aug. 10, 1948 |
| 2,458,652 | Sears | Jan. 11, 1948 |
| 2,463,535 | Hecht | Mar. 8, 1948 |
| 2,493,539 | Law | Jan. 3, 1950 |
| 2,538,836 | Jensen | Jan. 23, 1951 |
| 2,567,415 | Walsh | Sept. 11, 1951 |
| 2,568,448 | Hansen | Sept. 18, 1951 |
| 2,577,368 | Schultz et al. | Dec. 4, 1951 |
| 2,599,754 | Freeman | June 10, 1952 |
| 2,604,606 | Rajchman | July 22, 1952 |
| 2,611,100 | Faulkner et al. | Sept. 16, 1952 |
| 2,614,231 | Lawrence | Oct. 14, 1952 |
| 2,653,263 | Lawrence | Sept. 22, 1953 |